Jan. 13, 1942.                    E. C. HEAD                    2,270,003
                                 GEAR CUTTER
                            Filed March 2, 1936                 2 Sheets-Sheet 1
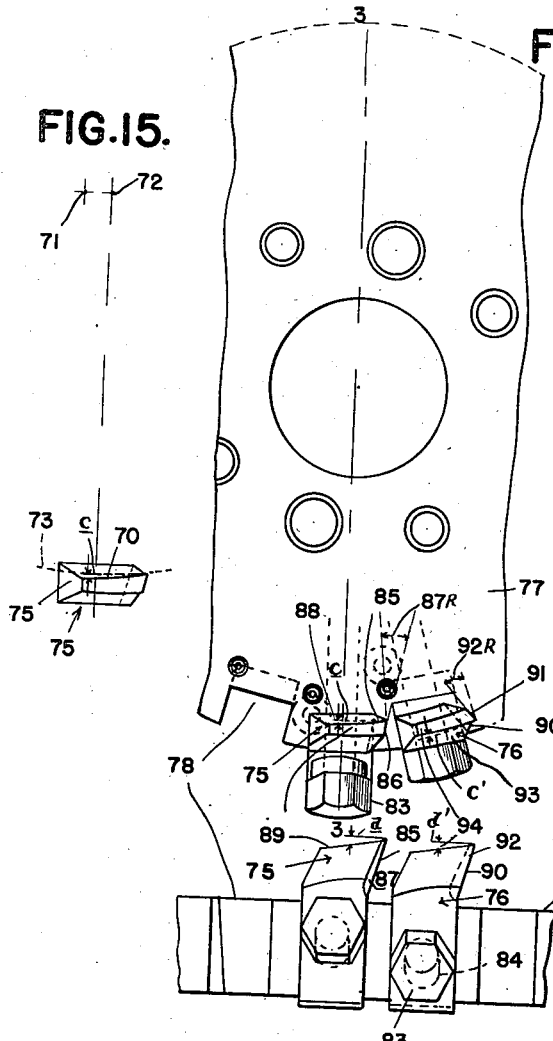
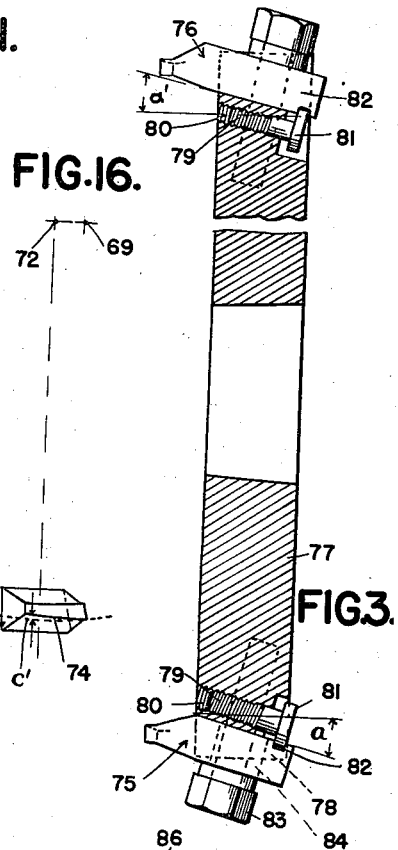
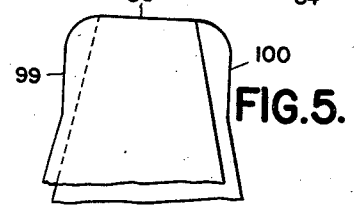
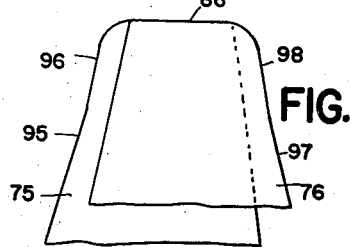
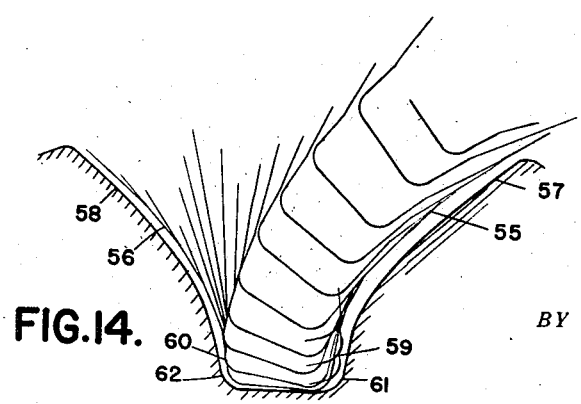
*INVENTOR*
ERNEST C. HEAD
BY Whittemore Hulbert Whittemore
   + Belknap         ATTORNEYS Jan. 13, 1942.  E. C. HEAD  2,270,003
GEAR CUTTER
Filed March 2, 1936   2 Sheets-Sheet 2
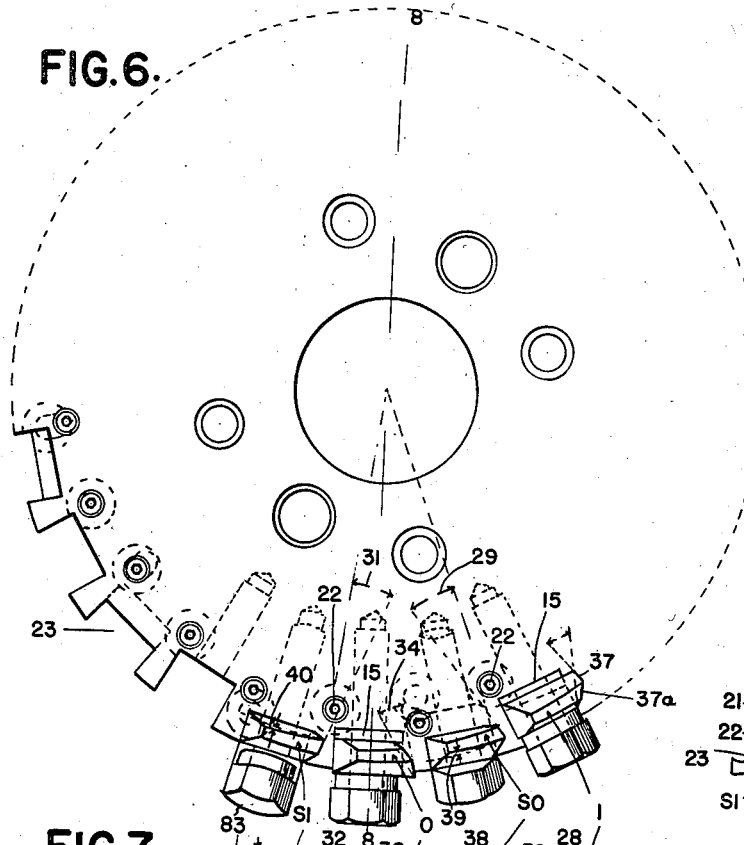
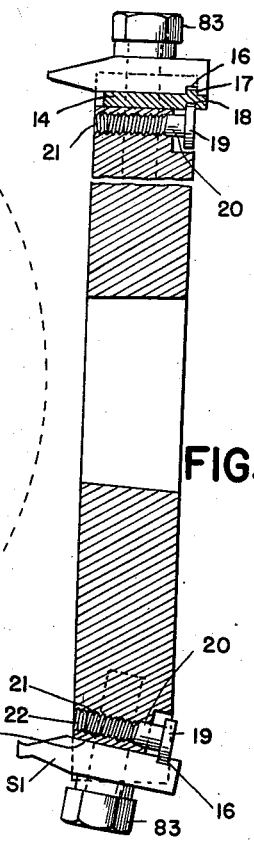
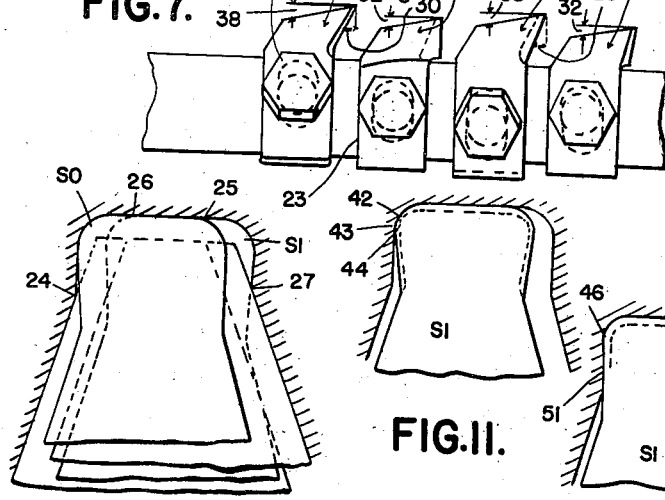
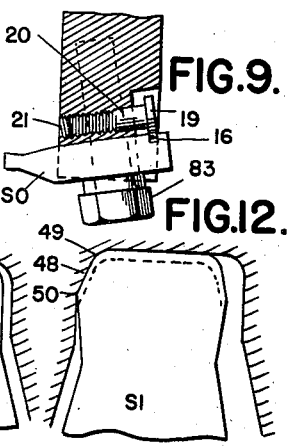
INVENTOR
ERNEST C. HEAD
BY
ATTORNEYS Patented Jan. 13, 1942

2,270,003

REISSUED

UNITED STATES PATENT OFFICE 2,270,003

GEAR CUTTER

Ernest C. Head, Detroit, Mich., assignor of one-half to Goddard & Goddard Company, Inc., Detroit, Mich., a corporation of Michigan Application March 2, 1936, Serial No. 66,672

16 Claims. (Cl. 29—105)

The invention relates to face mill cutters for cutting spiral bevel gears, pinions and the like, and is more particularly concerned with face mill cutters designed for rough cutting the gears prior to the finish cutting operation. Some of the features of the invention are improvements on or are related to the invention of my co-pending application, Serial No. 25,061, filed June 5, 1935.

The invention also relates to an improved method of rough cutting spiral bevel gears by means of which the finish cutting of the gears can be done more expeditiously and a greater amount of finish cutting performed with the finishing cutters before it is necessary to sharpen the cutter blades thereof.

The principal object of the invention is to provide a face mill gear cutter whose blades have a definite and ample amount of side or radial clearance regardless of the amount of top clearance, which gear cutter has provision for maintaining a fixed diameter and width of slot.

Another object of the invention is to provide a roughing cutter in which the blades are so sharpened that the bottom of the slot in the gear is cut to a width more closely approximating the desired width in the finished gear than the side portions of the slot. One of the purposes of this construction is to enable the tips of the blades in the finishing cutter to do relatively less work than the sides of the blades, thereby materially increasing the life of the finishing cutter blades. With a roughing cutter constructed in this manner it is a feature of this invention that means are provided for radially adjusting the inside and outside blades in order that the predetermined diameter and width of the bottom of the slot may be maintained when the blades are sharpened back.

The general objectives of the invention mentioned above may be obtained by means of various different constructions, and in the detailed description as hereinafter set forth I will refer to a plurality of constructions differing considerably in some respects but having in common certain novel inventive features.

Reference should be made to the drawings, in which

Figure 1 is a plan view of a face mill cutter embodying the invention with representative cutter blades shown in position;

Figure 2 is a partial side view thereof in development;

Figure 3 is a sectional view on the line 3—3 of Figure 1 illustrating the relative adjustment of the inside and outside cutting blades;

Figure 4 is a diagrammatic view illustrating the superposed cutting blades in relation to the slot which they are designed to cut;

Figure 5 is a similar view showing blades of a modified shape;

Figure 6 is a plan view of a modified face mill cutter employing separate slotting and side cutting blades;

Figure 7 is a partial side view thereof in development;

Figure 8 is a sectional view on the line 8—8 of Figure 6 illustrating the relative adjustment between slotting and side cutting blades;

Figure 9 is a fragmentary sectional view showing the adjustment of another slotting blade;

Figure 10 is a diagrammatic view illustrating the superposed cutting blades adjusted to form a roughing cutter;

Figure 11 is an enlarged end view of the cutting point of one of the slotting blades;

Figure 12 is a similar view of a modified construction;

Figure 13 is a similar view of a further modification;

Figure 14 is a diagrammatic view showing successive positions of the cutter during the generating motion when cutting a pinion;

Figure 15 is a top view of the inside blade 75 illustrating the method of obtaining the radial clearance C;

Figure 16 is a similar view of the outside blade 76 showing the method of obtaining the radial clearance c'.

A face mill cutting tool constructed in accordance with one form of my invention is illustrated in Figures 1 to 4. In this cutter the alternate blades are inside cutting blades 75 and outside cutting blades 76. These blades are arranged in an annular series in the cutter head 77 and extend in a direction generally parallel to the axis of the head when viewed from the side of the head, Figure 2, but are inclined with respect to the axis of the head when viewed in the cross section, Figure 3. The inside blades 75 are inclined with respect to the axis at an angle $a$ so that the blades are pointing inwardly, while the outside blades 76 are inclined at an angle $a'$ so that the blades are pointing outwardly. The blades are mounted in slots 78 on the outside diameter of the head and are slidable in the slots to permit the desired adjustment. An adjusting screw 79 engages a threaded aperture 80 paralleling the inclination of the blade and has an enlarged head 81 engageable in a recess 82 in the shank of the blade. Each blade is secured in adjusted position by a bolt 83, the head of which bears against the outside face of the shank. An elongated aperture 84 in the shank is of sufficient length to permit the desired range of adjustment.

The inside cutting blade 75 has an inside cutting edge 85 and a top cutting edge 86 formed by the intersection of the front face 87 with the inside face 88 and top cutting face 89 respectively. Correspondingly the outside blade 76 has an outside cutting edge 90 and a top cutting edge 91 formed by the intersection of the front face 92 with the outside face 93 and the top face 94 respectively. The front faces 87 and 92 of the inside and outside blades are inclined at rake angles $87^R$ and $92^R$ respectively which are in opposite directions in the two blades. The inside face 88 of the inside blade 75 is relieved back of the cutting edge 85 to form side clearance, and the side clearance angle is indicated at $c$, Figure 1. The corresponding relief in the outside surface 93 of the outside blade 76 forms the side clearance angle $c'$. The top face 89 of the inside blade has a top clearance angle indicated at $d$, Figure 2, while the top face 94 of the outside blade has a top clearance angle $d'$.

The position of the inside and outside blades in relation to the slot to be cut is shown diagrammatically in Figure 4 where it will be readily seen that the inside of the slot is formed by the inside blade 75 only, and the outside of the slot is formed by the outside blade 76 only. In one form of the present invention the cutting portions of the blades have the top end portions thereof shaped to produce an enlarged width of slot at the bottom thereof. Thus the inside blade has the straight line portion 95 for cutting the inside of the slot but has a portion 96 of different shape at the top of the blade which merges with the top cutting edge 86. As shown in Figure 4, the portion 96 has an angle less than the angle 95 which is then curved at the corner and merges into the top edge 86. The outside blade 76 also has a straight side cutting portion 97 and a shaped top portion 98 of lesser angle. These shaped portions 96 and 98 may be termed slotting portions of the blades since they produce an enlarged width at the bottom of the slot. The slotting portions of the blades may, if desired, extend at right angles to the edge 86 as illustrated in Figure 5 at the points 99 and 100, in which case there will be no side clearance component due to the top clearance. Also the portions 96 and 98 of the blades may be otherwise shaped to remove a larger amount of stock at the bottoms of the slots than would be obtained if the blades maintained the straight lines 95 and 97 to the top thereof.

Figure 15 illustrates the method of obtaining the radial clearance $c$ on the inside blade 75. As mentioned above in connection with Figure 5, when the shaped portions 99 and 100 are at right angles to the top edge 86, there is no side clearance component due to the top clearance. This portion of such a blade would cut an annular slot having straight side walls. Also blades having the top portions 96 and 98, Figure 4, of slight angle would cut materially an annular slot. It will be seen that all points of this blade back of the cutting edge must travel around the annular slot cut by the blade and have clearance so no rubbing action takes place between the blade and the work. Therefore, the blade must have a top clearance $d$ and a side clearance from front to back $c$ as shown by the line 70. The line 70 as will be seen from Figure 15 is struck from a center 71 offset back from the center 72 of the cutting tool so that as the front cutting edge travels in a true circular path indicated by the dotted line 73 the rear edge of the blade has side clearance with respect thereto. It will thus be seen that when the inside blade is sharpened back, it will cut the inner wall of the slot to a greater diameter.

Figure 16 is a corresponding view of the outside blade 76. This blade must have a top clearance $d'$ and a side clearance from front to back $c'$ as shown by the line 74. The line 74 is struck from a center 69 offset forwardly from the center 72 so that as the front cutting edge travels in a true circular path indicated by the dotted line 68, the rear edge of the blade has side clearance with respect thereto. It will thus be seen that when the outside blade is sharpened back, it will cut the outer wall of the slot to a smaller diameter.

The curved line 70 of the inside blade and the curved line 74 of the outside blade may be obtained in any suitable manner in order to properly provide the necessary radial clearance $c$ and $c'$. One method of grinding this relief is shown in my co-pending application, Serial No. 25,061, filed June 3, 1935.

In accordance with the present invention, means is provided so that substantially a fixed diameter and width of slot will be obtained regardless of how far the blades are sharpened back. This is done by adjusting the inside blade in the direction of the angle $a$ and the outside blade in the direction of the angle $a'$. These angles are predetermined from the clearance angles of the cutting blades and may be determined by certain formulas. The formula for the inside blades is:

$$\text{tangent } a = \frac{\text{tangent } c}{\text{tangent } d}$$

The formula for the outside blades is:

$$\text{tangent } a' = \frac{\text{tangent } c'}{\text{tangent } d'}$$

From these formulas the values of the angles $a$ and $a'$ may be determined and the slots in the cutter head 77 constructed to correspond with these angles.

One of the advantages of a cutter head constructed in this manner is that when the blades are sharpened back, they may be easily adjusted in the slots to obtain a fixed diameter and width of slot. Thus it is only necessary to adjust each of the blades so that the tips of the blades are at a fixed axial distance from the cutter head which may readily be obtained by a gauge block and the desired diameter and width of slot will automatically be obtained. Each time the blades are sharpened back they are adjusted in this manner to the fixed axial distance and the cutter is then ready for use.

With a face mill cutter as above described, the inside blade 75 cuts the bottom and inside of the slot, while the outside blade 76 cuts the bottom and outside of the slot. With respect to the finished dimensions of the slot, there is more stock removed at the bottom than at the sides so that in the finishing operation whether it be by means of a finishing face mill cutter or by means of a grinding wheel, less stock is required to be removed at the bottom of the slot than at the sides thereof. This effects a material saving in the life of the finishing apparatus since it is at the points of the teeth, or the grinding wheel, as the case may be, where the most severe wear occurs.

A modified form of face mill cutter is illustrated in Figures 6 to 9. In this form of the invention four different kinds of blades are used for cutting different portions of the profile of the slot. Two of these blades are termed "slotting blades" since they are used for cutting only in the bottom of the slot. The other two blades are termed "side cutting blades" and one is adapted for cutting the inside profile of the slot and the other the outside. The two slotting blades are also designed so that one cuts the inside bottom portion of the slot and the other the outside bottom portion. The blades may be grouped together in different ways, but as illustrated the order is first a slotting blade, then a side cutting blade, then a slotting blade, etc. Thus as shown in Figures 6 and 7, I represents an inside side cutting blade, SO represents the outside slotting blade, O is the outside side cutting blade and SI is the inside side cutting blade. All of the blades are held in the blade holders in the head by means of clamping bolts 83.

The side cutting blades may be positioned radially in any suitable manner such as by employing shims 14 and 15 in the back of the slots forming the blade holders. The side cutting blades are also arranged to provide an axial adjustment and for this purpose the shank of the blade is provided with a transverse groove 16 for receiving the projecting lip 17 of the shim 14. This shim 14 is in turn provided with a recess 18 in which the head 19 of the adjusting screw 20 engages. The adjusting screw is threaded in an axially extending threaded hole 21 and is provided with a socket head 22 by which adjustment is made from the top of the cutter head.

The slotting blades are also adjustable in the head but preferably in such a manner as to adjust the same not only axially but also radially. Accordingly the slots 23 forming the blade holders are arranged at an angle, the inside slotting blade SI pointing inwardly and the outside slotting blade SO pointing outwardly. The adjusting screws for the slotting blades are threadedly adjusted in a direction parallel to the respective slotting blades so that the head 19 of the adjusting screw may directly engage the recess 16 in the shank of the blade.

Figure 10 shows the relative positions of the four types of cutter blades during the cutting operation. The slotting blade SO is adapted to cut that portion of the slot from the point 24 to the point 25. The inside slotting blade SI cuts the portion of the slot from the point 26 to the point 27. The inside blade I cuts the surface of the slots from the point 27 to the top of the slot, whereas the outside blade O cuts the surface of the slot from the point 24 to the top of the same.

The primary advantage of the use of the two overlapping slotting blades for the outside and inside slotting respectively is that it enables the slot width to be maintained constant after the slotting blades become worn and require resharpening. To do this the slotting blades SI and SO are adjusted by their respective adjusting screws and because of the angle of these blades in the cutter head, the inside slotting blade will be thereby moved radially inward as well as axially, while the outside slotting blade will be moved radially outward as well as axially. To compensate for the axial movement of the slotting blades the side cutting blades O and I may be correspondingly adjusted in an axial direction.

Another advantage of the use of two slotting blades is that it enables the most desirable shear and rake angles to be ground on both the outside and inside slotting blades. Thus as illustrated, 28 represents the front rake angle of the outside slotting blade and 29 represents the side shear angle. The inside slotting blade SI is made with a front rake angle 30 and a side shear angle 31.

The inside and outside side cutting blades are similar to the conventional blades used in face mill cutters and can be made by the usual methods of construction. However, the clearance angles for the top clearance may be constructed to be of the theoretically correct angle for most efficient cutting whereas in the blades heretofore made the clearance angles have necessarily been a compromise due to the fact that in the conventional blade which cuts on the side 37 and the top 37a simultaneously, the top clearance angle 32 must be great enough to give sufficient side clearance. In other words, the side clearance angle is a component of the top clearance angle 32 and varies with the tangent of the pressure angle. Therefore, if angle 32 is made large enough to give the proper side clearance, then angle 32 is too great for efficient top cutting and conversely, if angle 32 is made correct for top cutting, then side clearance is not sufficient for side cutting.

As the side cutting blades in my improved cutter do not cut on the top 37 it will be apparent that the clearance angle 32 in my blades is made sufficient to give the most efficient side clearance. Also, side rake angle 34 is made according to the best known practice for a side cutting tool without requiring modification because of any top cut.

All points of each of the slotting blades SO and SI back of the cutting edges must travel around the annular slot cut by the blades and have clearance so that no rubbing action takes place between the blades and the work. Therefore each blade must have a top clearance 38, slotting blade SO must have on the outside surface a side clearance 39 from front to back, and inside blade SI must have the side clearance 40 on the inside surface. The front rake angle ground on each of the slotting blades is different, the outside slotting blade having the front rake angle 28 and the inside slotting blade having the rake angle 30. The side shear angles are different on the two slotting blades, the outside slotting blade having the side shear angle 29 and the inside slotting blade having the side shear angle 31. It should be observed that the top clearance angle 38 on each slotting blade is less than the top clearance angle on the side cutting blades. The top clearance angle 38 of the slotting blades can be made in accordance with the best practice suited for its particular work and need not be the same as the corresponding angle in the side cutting blades.

The side clearance angle 40 on the inside surface of the inside slotting blade is essential to the successful operation of the cutter, and to better explain this I have shown in large views the cutting point of the slotting blade SI in Figures 11 to 13 inclusive which illustrate several forms of the invention. In Figure 11, the small radius 42 at the corner of the cutting edge stops at a point 43. In this form of the slotting blade there will be a top clearance component at the point 43. Then it is necessary to have only a slight side clearance 40 from the point 43 at the front of the blade to the point 44 at the back of the blade.

Another modified form is shown in Figure 12 in which a portion 48 of the cutting edge tangent to the radius 49 is made to angle outward to the point 50. Here again there is a side component to the top clearance angle but an additional clearance is necessary at 50 so that the blade will clear in the slot cut.

Figure 13 represents another modified form of blade similar to that disclosed in Figure 15 except that from the point 46 the side edge 51 runs straight down and side clearance back of this edge is provided.

In each of the Figures 11, 12 and 13 I have shown only the inside slotting blade SI, and it will be noted that the inside edge which is at the left in these figures is in contact with the slot while the other edge clears the slot. Consequently it is unnecessary to provide special clearance on the latter side of the inside slotting blade. The distance between the outside surface of the inside slotting blade and the walls of the slot is exaggerated in the drawings. The construction of the outside edge of the outside slotting blade SO complementary to the inside slotting blade SI has not been illustrated in Figures 11 to 13 but it wil be understood that it will be constructed in accordance with the same principles as the blade SI.

Figure 14 illustrates the invention as applied to the rough cutting of a spiral bevel pinion whether by means of the two-blade type of cutter first described or the four-blade type of cutter subsequently described. The successive positions which the cutter will take in rolling out the curved shape of the tooth are shown. Spiral bevel pinions cut with this cutter are usually developed by the well known generating method in which the pinion is rolled with the cutter as said pinion would roll with a crown gear of the system. The cutter in this case represents the crown gear. By rolling the cutter and pinion together as shown in Figure 14, curves 55 and 56 are developed. Curves 57 and 58 represent the shape of the finished tooth and illustrate the amount of stock left for the finishing cutter to remove.

It will be seen that the tooth is really generated with a cutter having a different pressure angle at the point from that back farther on the blade. The upper side cutting portions generate curves 55 and 56 of a given pressure angle and the lower portions of this cutter generate curves 59 and 60. Lines 61 and 62 represent the portion of the tooth as generated by the finishing cutter. The fact that the pressure angle at the point of the blade is less than that back farther on the blade means that a different curve 59—60 is generated in the bottom of the tooth than the curve 61—62 generated by the finishing cutter. The nature of the curve is such that more stock is removed than would be if the blade had the same pressure angle at the point as farther back. Therefore the top portions of the cutter blades undercut a greater amount and leave a minimum amount of stock for the finishing cutter to remove between surfaces 59 and 61 and also between surfaces 60 and 62. The amount of stock left for finishing is greater between curves 55 and 57 and also between 56 and 58 and is uniform for this portion of the tooth. While the generation of pinions in the manner illustrated in Figure 14 is usually employed for the rough cutting operation, it should be understood that a cutter designed to operate in the same manner may also be used for finish cutting if it is desirable to give extra relief or clearance at the bottom of the tooth.

In the preceding description of the various modifications of my invention, I have shown that the invention may be embodied in cutters differing considerably in their specific constructions. In every case, however, there are certain underlying novel features, the chief of which is the provision of means for maintaining a fixed diameter and width of slot when the cutter blades are resharpened.

What I claim as my invention is:

1. A face mill gear cutter blade having a top surface inclined at an angle to give top clearance, one edge of said top surface forming a curved line, a side cutting edge and a side surface adjacent to the top edge and back of said cutting edge, the top portion of said cutting edge forming an obtuse angle with said top surface and the remainder of said cutting edge being at a greater angle than said top portion, said surface back of said cutting edge being relieved to give any required amount of cutting clearance.

2. A face mill gear cutter blade having a side cutting edge and a surface back of said cutting edge, said cutting edge having a top portion and a bottom portion, both of said portions having positive pressure angles, said top portion having a pressure angle less than that of said bottom portion, the surface back of said cutting edge being relieved for cutting clearance.

3. A face mill gear cutter, comprising a rotary head and a plurality of annularly arranged cutting blades secured thereto and extending in a direction generally parallel to the axis of the head, said blades having side cutting edges the cutting edges of said blades having a top portion and a bottom portion, both of said portions having positive pressure angles, said top portion having a pressure angle less than that of said bottom portion, said blades being relieved on their sides back of their cutting edges to provide cutting clearance.

4. A gear cutter comprising a rotary head and a plurality of annularly arranged cutting blades secured thereto, the cutting portions of said blades extending in a direction generally parallel to the axis of the head, some of said blades having inside cutting edges and some having outside cutting edges with surfaces back of both inside and outside cutting edges, each of said cutting edges having a top portion which is inclined at a positive pressure angle, and a bottom portion having a straight profile of greater positive pressure angle than said top portion, the surfaces back of said cutting edges being relieved sufficiently for cutting clearance.

5. A face mill gear cutter for generating gears comprising a rotary head and a plurality of annularly arranged cutting blades secured thereto and extending in the direction of the axis of rotation of said head, said blades having side cutting edges thereon consisting of a top portion and a bottom portion, the bottom portion extending for the greater portion of the height of the blade and having a straight profile of positive pressure angle, and the top portion extending at a different and lesser pressure angle.

6. A face-mill gear cutter for generating gears, the teeth of which have profiles that are relieved at the bottom portion thereof, comprising a rotary head and a plurality of annularly arranged cutting blades secured thereto and extending in the general direction of the axis of rotation of said head, said blades having effective side cutting edges of positive pressure angle and straight profile for generating the greater portion of the profile of said gear teeth and having effective side cutting edges of different and lesser pressure angle for generating said relieved portion of said gear teeth.

7. A face-mill gear cutter for generating gears comprising a rotary head and a plurality of annularly arranged cutting blades secured thereto and extending in the general direction of the axis of rotation of said head, said blades having lower side cutting edges extending for the greater portion of the height of the blades and having a straight profile of positive pressure angle, and having upper side cutting edges extending at a different and lesser positive pressure angle.

8. A face-mill gear cutter comprising a rotary head and a plurality of cutting blades that project beyond one side face of the head and are arranged at equal radial distances from the axis of the head, certain of the blades having each a side face of one pressure angle and each of the remaining blades having a corresponding side face which is of a different pressure angle, each blade having a side-cutting edge formed at the juncture of its front face and the described side face, the pressure angles of the said side faces of the two groups of blades being so chosen that the side cutting edges of greater pressure angle will be effective for the greater part of the effective cutting height of the cutter and the side cutting edges of smaller pressure angle will be effective for only that part of the effective cutting height of the cutter which lies adjacent the top of the cutter so as to cut the dedendum portion of a side of a gear tooth only.

9. A face mill gear cutter for generating gears comprising a rotary head and a plurality of annularly arranged cutting blades secured thereto, the cutting portions of said blades extending beyond the face of said head in the general direction of the axis of rotation of said head, said blades having side cutting edges thereon consisting of a top portion and a bottom portion, the bottom portion extending for the greater portion of the height of the blade and having a straight profile of positive pressure angle, and the top portion extending at a positive pressure angle which is different and lesser than the pressure angle of said bottom portion.

10. A face mill gear cutter for generating gears, the teeth of which have profiles that are relieved at the bottom thereof, comprising a rotary head and a plurality of annularly arranged side cutting blades secured thereto, the cutting portions of said blades extending beyond the face of said head in the general direction of the axis of rotation of said head, some of the side cutting edges of said blades having a positive pressure angle and straight profile for generating the unrelieved portion of the profile of said gear teeth and others of the side cutting edges of said blades having a positive pressure angle different and lesser than the first mentioned pressure angle for generating said relieved portion of said gear teeth.

11. A face mill gear cutter for generating gears, the teeth of which have profiles that are relieved at the bottom thereof, comprising a rotary head and a plurality of annularly arranged side cutting blades secured thereto, the cutting portions of said blades extending beyond the face of said head in the general direction of the axis of rotation of said head, some of the side cutting edges of said blades having a positive pressure angle and straight profile for generating the unrelieved portion of the profile of said gear teeth and some of the side cutting edges of said blades having a different and lesser positive pressure angle for generating said relieved portion of said gear teeth, the line of each first mentioned side cutting edges intersecting the line of each second mentioned side cutting edges below the top of said blades when said lines are projected into a common radial plane.

12. A face mill gear cutter for generating gears, the teeth of which have profiles that are relieved in the dedendum portion thereof, comprising a rotary head and a plurality of annularly arranged side cutting blades secured thereto, the cutting portions of said blades extending beyond the face of said head in the general direction of the axis of rotation of said head, some of the side cutting edges of said blades having a positive pressure angle and straight profile for generating the unrelieved portion of the profile of said gear teeth and some of the side cutting edges of said blades having a positive pressure angle of different and lesser pressure angle for generating said relieved dedendum portion of said gear teeth, the line of each of the first mentioned side cutting edges intersecting the line of each of the second mentioned side cutting edges when said lines are projected into a common radial plane, said intersection being at the point corresponding to the commencement of the relief in the dedendum portion of the gear tooth profile.

13. A face mill gear cutter for generating gears, the teeth of which have profiles that are provided with extra relief or clearance at the bottom portion thereof, comprising a rotary head and a plurality of annularly arranged cutting blades secured thereto, the cutting portions of said blades extending beyond the face of said head in the general direction of the axis of rotation of said head, one of said blades having a side cutting edge of positive pressure angle and straight profile extending from the bottom of the cutting portion of said blade toward the top thereof for the greater portion of the height of said blade and another of said blades having a side cutting edge of positive and lesser pressure angle at the top of said blade.

14. A face mill gear cutter for generating gears, the teeth of which have profiles that are provided with extra relief or clearance at the bottom portion thereof, comprising a rotary head and a plurality of annularly arranged cutting blades secured thereto, the cutting portions of said blades extending beyond the face of said head in the general direction of the axis of rotation of said head, one of said blades having a side cutting edge of positive pressure angle and straight profile extending from the bottom of the cutting portion of said blade toward the top thereof for the greater portion of the height of said blade and another of said blades having a side cutting edge at the top of said blade of a positive and lesser pressure angle, said blades being so mounted in said head that the line of the side cutting edge of said second mentioned blade intersects the line of the side cutting edge of said first mentioned blade below the top of said blade when said lines are projected into a common radial plane.

15. A face mill gear cutter for generating gears, the teeth of which have profiles that are relieved at the bottom portion thereof, comprising a rotary head and a plurality of annularly arranged cutting blades secured thereto, the cutting portions of said blades extending beyond the face of said head in the general direction of the axis of rotation of said head, said blades having effective side cutting edges of positive pressure angle and straight profile for generating the greater portion of the profile of said gear teeth and having effective side cutting edges of positive pressure angle different and lesser than the first mentioned pressure angle for generating said relieved portion of said gear teeth, the line of each of the first mentioned effective side cutting edges intersecting the line of each of the second mentioned effective side cutting edges below the top of said blades when said lines are projected into a common radial plane.

16. A face mill gear cutter blade for insertion in a rotary head, the said blade having a cutting portion shaped to extend in the general direction of the axis of rotation of said head, said cutting portion having a side cutting edge, the bottom part of which is straight, of positive effective pressure angle, and extends for the greater portion of the height of said cutting edge, the rest of said side cutting edge above said bottom part having a lesser but positive effective pressure angle.

ERNEST C. HEAD.